(12) United States Patent
Chen

(10) Patent No.: US 9,776,492 B2
(45) Date of Patent: Oct. 3, 2017

(54) ELECTRIC VEHICLE

(75) Inventor: Mingjun Chen, Shenzhen (CN)

(73) Assignee: SHENZHEN SKD TECHNOLOGY INDUSTRIAL LIMITED, Shenzhen (CN)

(*) Notice: Subject to any disclaimer, the term of this patent is extended or adjusted under 35 U.S.C. 154(b) by 573 days.

(21) Appl. No.: 14/123,476

(22) PCT Filed: Jul. 5, 2011

(86) PCT No.: PCT/CN2011/076873
§ 371 (c)(1),
(2), (4) Date: Dec. 2, 2013

(87) PCT Pub. No.: WO2013/000177
PCT Pub. Date: Jan. 3, 2013

(65) Prior Publication Data
US 2014/0091736 A1  Apr. 3, 2014

(30) Foreign Application Priority Data
Jun. 28, 2011  (CN) .......................... 2011 1 0177011

(51) Int. Cl.
*B60K 1/04*  (2006.01)
*B60K 6/00*  (2006.01)
*H02J 7/14*  (2006.01)
*B60K 6/30*  (2007.10)
*B60K 6/12*  (2006.01)

(52) U.S. Cl.
CPC .................. *B60K 1/04* (2013.01); *B60K 6/00* (2013.01); *B60K 6/30* (2013.01); *H02J 7/1415* (2013.01); *B60K 2006/123* (2013.01); *Y02T 10/7005* (2013.01)

(58) Field of Classification Search
CPC ........................................................ B60K 1/04
USPC ............................................................. 318/3
See application file for complete search history.

(56) References Cited

U.S. PATENT DOCUMENTS 6,054,838 A * 4/2000 Tsatsis .................... B60K 6/12
                                                                180/165
7,250,690 B2 * 7/2007 Yang ...................... F01D 15/10
                                                                290/40 B
(Continued)

FOREIGN PATENT DOCUMENTS

CN       101056039 A       10/2007
FR    WO 03069132 A1 *     8/2003   .......... F01K 21/042
JP        11013481 A   *   1/1999

*Primary Examiner* — Kawing Chan
(74) *Attorney, Agent, or Firm* — Shimokaji IP

(57) ABSTRACT

An electric vehicle (1) includes a charging circuit (11), a battery (12) and a driving electric motor (13), and an air compressor (14), an air storage tank (15), a turbine (16) and a generator (17). Air is compressed and stored in the air storage tank when the air compressor starts up. The air storage tank is provided with a switch valve, and under the control of the switch valve the air stored in the air storage tank is fed to the turbine. By means of providing an air compressor, an air storage tank, a turbine and a generator, and using air energy to generate power and using the battery to supply power in parallel, the continuous mileage of the electric vehicle is increased. In addition, the service life of the battery is prolonged, because the battery is used in a low depth of charge/low depth of discharge manner.

11 Claims, 4 Drawing Sheets

(56) References Cited

U.S. PATENT DOCUMENTS

| | | | | |
|---|---|---|---|---|
| 7,665,554 B1* | 2/2010 | Walsh | ................... | B60K 16/00 |
| | | | | 180/165 |
| 8,527,095 B2* | 9/2013 | Kikuchi | ............. | B60H 1/00278 |
| | | | | 165/121 |
| 2002/0066608 A1* | 6/2002 | Guenard | ................... | B60K 1/00 |
| | | | | 180/65.22 |
| 2002/0163200 A1* | 11/2002 | Oglesby | .............. | B60L 11/1881 |
| | | | | 290/52 |
| 2006/0059937 A1* | 3/2006 | Perkins | .................... | F02C 6/16 |
| | | | | 62/259.2 |
| 2007/0251236 A1* | 11/2007 | Barthelet | ............ | H02P 23/0004 |
| | | | | 60/608 |
| 2009/0133943 A1* | 5/2009 | Noguchi | ................... | B60K 1/04 |
| | | | | 180/65.21 |
| 2010/0018203 A1* | 1/2010 | Richards | ................ | F01D 15/10 |
| | | | | 60/598 |
| 2010/0243016 A1* | 9/2010 | Awashima | .............. | F01K 25/10 |
| | | | | 136/205 |
| 2011/0014828 A1* | 1/2011 | Domes | .................... | B60K 6/12 |
| | | | | 440/3 |
| 2011/0159326 A1* | 6/2011 | Oya | ...................... | B60L 3/0007 |
| | | | | 429/82 |

* cited by examiner

ELECTRIC VEHICLE

CROSS REFERENCE TO RELATED APPLICATIONS

This application claims the benefit of priority to China patent application NO. 201110177011.3 filed in the Chinese Patent Office on Jun. 28, 2011 and entitled "AN NOVEL ELECTRIC VEHICLE", the content of which is incorporated herein by reference in its entirety.

FIELD

The present invention relates to electric vehicle technical field, and more specifically, to a novel electric vehicle.

BACKGROUND

Currently, electric vehicles are basically classified into pure electric vehicles and hybrid electric vehicles. A pure electric vehicle has a drawback that the limited capacity of its battery results in a relatively short continuous mileage, and the electric vehicle will not work if the battery is abnormal or empty during the drive. Moreover, since the battery is the only source to supply power to the pure electric vehicle, the battery is usual continuously discharged for long periods during using, which has a great influence to the service life of the battery. In a hybrid electric vehicle, a fuel generator is added on a basic structure of the pure electric vehicle, and the above drawback of the pure electric vehicle is overcome. However, the hybrid electric vehicle brings some new problems, which are mainly in the following aspects. Firstly, the fuel that it uses is non-renewable resources. When fuel is burned during the car driving, carbon dioxide gas is exhausted, which causes heavy pollution to the environment and is adverse to the concept "green travel" promoted in the world. Secondly, the continuously rising of fuel prices increases the cost of using hybrid electric vehicle. Therefore, it has been a problem pressing for solution in the electric vehicle technical field to design a novel electric vehicle that has an enhanced continuous mileage and a prolonged service life of the battery, and meanwhile is environmentally friendly.

SUMMARY

One technical problem to be solved in embodiments of the present invention is to provide a novel electric vehicle that has an enhanced continuous mileage and a prolonged service life of battery, and meanwhile is environmentally friendly.

To achieve the above purpose, one embodiment of the present invention provide a novel electric vehicle that comprises a charging circuit, a battery and a driving electric motor connected together. Moreover, the novel electric vehicle further comprises: an air compressor, a gas storage tank, a turbine and a generator connected together;

air is compressed and stored in the air storage tank when the air compressor starts up;

the air storage tank is provided with a corresponding switch valve, and under the control of the switch valve the stored air is fed to the turbine;

the turbine converts air energy of the introduced air into kinetic energy, thereby driving the generator to generate electrical power; and the generator is connected with the driving electric motor or the battery, for supplying power to the driving electric motor or for charging the battery during power generation.

Further, the generator is connected respectively with the driving electric motor and the battery to supply power to the driving electric motor and to charge the battery during power generation.

Preferably, the novel electric vehicle is further provided with a power supply control apparatus, the power supply control apparatus comprising:

a detection unit for detecting an amount of power generated by the generator and an amount of power required by the driving electric motor during running of the novel electric vehicle;

a comparison unit for comparing the detected amount of generated power with the detected amount of required power, wherein, when the amount of generated power is greater than the amount of required power, the comparison unit sends out a first control signal, and otherwise, the comparison unit sends out a second control signal; and a control unit for, when receiving the first control signal, controlling the generator to provide an amount of the generated power equal to the amount of required power to the driving electric motor, and to input a portion of the amount of generated power exceeding the amount of required power to the battery to charge the battery, and when receiving the second control signal, controlling the generator to provide all of the amount of generated power to the driving electric motor.

Further, the novel electric vehicle further comprises a decompression valve connected between the gas storage tank and the turbine, the decompression valve is used for decompressing the air outputted by the gas storage tank.

Further, the novel electric vehicle further comprises an airway connected to a vent of the turbine, the gas discharged by the vent is guided by the airway to the battery to exhaust.

Further, the novel electric vehicle further comprises a gas storage apparatus connected to the vent of the turbine, the gas storage apparatus is provided with an opening facing to a passenger space in the novel electric vehicle, the opening is provided with a switch valve, the gas in the gas storage apparatus is exhausted from the opening to the passenger space of the novel electric vehicle when the switch valve is opened.

Further, the air compressor is a direct current air compressor or an alternating current air compressor.

Further, the generator is a direct current generator or an alternating current generator.

In implementation of the novel electric vehicle provided by one embodiment of the present invention, the following beneficial effects can be achieved.

Firstly, by providing an air compressor, an air storage tank, a turbine and a generator, air energy can be utilized to generate power in parallel with power supplied by the battery. Thus, the continuous mileage of the electric vehicle is increased without causing environmental pollution. Meanwhile, due to the introduction of power generated by air energy, the battery is not a signal power supply and does not need to be continuously discharged for long periods. As a result, the battery can have an effect of shallow charge/discharge, and so the service life of the battery can be prolonged.

Secondly, by providing an airway, cold air exhausted by the above turbine is guided to the battery to exhaust, which avoids that the battery works in a high temperature environment and helps to prolong the service life of the battery.

Thirdly, by providing a gas storage apparatus and an opening facing to a passenger space in the novel electric vehicle, the cold air exhausted by the turbine is discharged to the passenger space. Thereby, the passenger can enjoy the same cooling effect as that of an air conditioner without using any air conditioners, and therefore, energy can be saved.

BRIEF DESCRIPTION OF THE DRAWINGS

In order to more clearly illustrate embodiments of the present invention or technical solutions in existing technology, drawings assisting in describing the embodiments or existing technology are briefly introduced below. It is apparent that the drawings in the following description are only some embodiments of the present invention. A person having ordinary skills in the art can also obtain other drawings on the basis of these drawings without paying any creative work.

DETAILED DESCRIPTION OF ILLUSTRATED EMBODIMENTS

The novel electric vehicle provided by embodiments of the present invention can have an increased continuous mileage and a prolonged service life of the battery, and meanwhile is beneficial to the environment protection.

Technical solutions in embodiments of the present invention will be illustrated clearly and entirely with the aid of the drawings in the embodiments of the present invention. Obviously, the described embodiments herein are only a part of embodiments, but not all of embodiments. Based on the embodiments of the present invention, all of other embodiments obtained by a skilled person in the art without paying any creative work should fall within the protection scope of the present invention.

Figure 1:
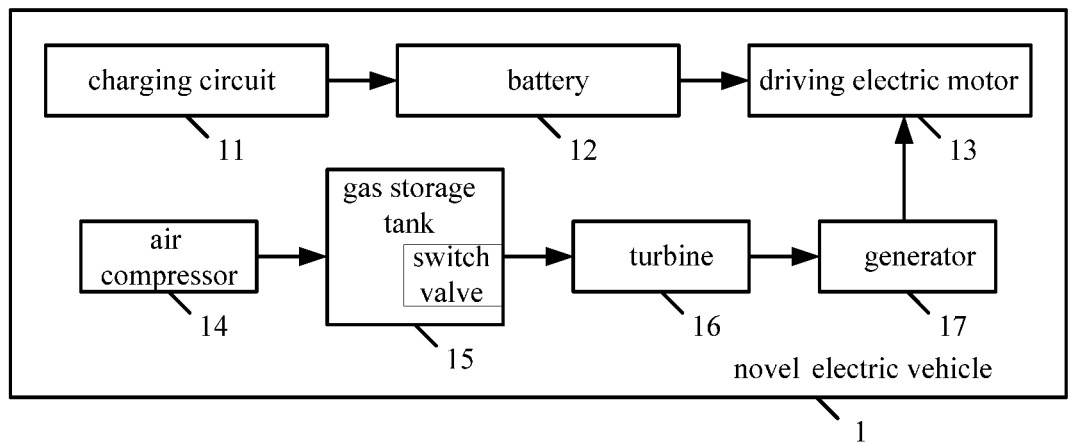
FIG. 1 is a structure diagram for a first embodiment of a novel electric vehicle provided by the present invention.

Refer to FIG. 1, it is a structure diagram for a first embodiment of a novel electric vehicle provided by the present invention. As shown in FIG. 1, the novel electric vehicle 1 comprises a charging circuit 11, a battery 12 and a driving electric motor 13 connected together. In addition, the novel electric vehicle further comprises: an air compressor 14, an air storage tank 15, a turbine 16 and a generator 17 connected together. The generator 17 is connected to the driving electric motor 13.

When the charging circuit 11 is connected to an external electrical power, the battery 12 is charged and supplies power to the driving electric motor 13.

When connected to an external electrical power, the air compressor 14 may start up, and air is compressed and stored in the air storage tank 15.

Specifically, the air compressor 14 is a direct current air compressor or an alternating current air compressor.

The air storage tank 15 is provided with a corresponding switch valve, and under the control of the switch valve the stored air is fed to the turbine 16.

The turbine 16 converts air energy of the introduced air into kinetic energy, thereby driving the generator 17 to generate electrical power.

The generator 17 is used for supplying power to the driving electric motor 13 during power generation.

Specifically, the generator is a direct current generator or an alternating current generator.

In implementation of the novel electric vehicle provided by one embodiment of the present invention, the following beneficial effects can be achieved.

By providing an air compressor, an air storage tank, a turbine and a generator, air energy can be utilized to generate power in parallel with power supplied by the battery. Thus, the continuous mileage of the electric vehicle is increased without causing environmental pollution. Meanwhile, due to the introduction of power generated by air energy, the battery is not a signal power supply and does not need to be continuously discharged for long periods. As a result, the battery can have an effect of shallow charge/discharge, and so the service life of the battery can be prolonged.

Figure 2:
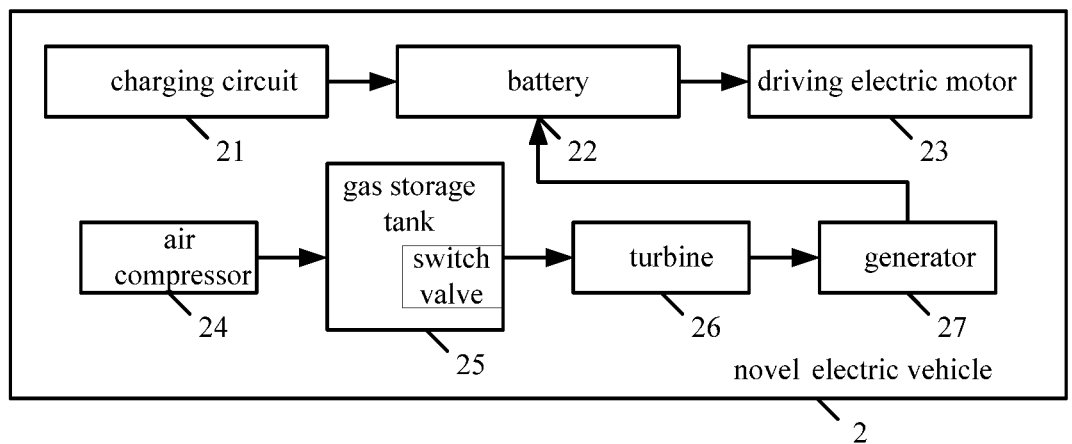
FIG. 2 is a structure diagram for a second embodiment of a novel electric vehicle provided the present invention.

Refer to FIG. 2, it is a structure diagram for a second embodiment of a novel electric vehicle provided by the present invention. As shown in FIG. 2, the novel electric vehicle 2 comprises a charging circuit 21, a battery 22 and a driving electric motor 23 connected together. In addition, the novel electric vehicle 2 further comprises: an air compressor 24, an air storage tank 25, a turbine 26 and a generator 27 connected together. The generator 27 is connected to the battery 22.

When the charging circuit 21 is connected to an external electrical power, the battery 22 is charged and supplies power to the driving electric motor 23.

When connected to an external electrical power, the air compressor 24 may start up, and air is compressed and stored in the air storage tank 25.

Specifically, the air compressor 24 is a direct current air compressor or an alternating current air compressor.

The air storage tank 25 is provided with a corresponding switch valve, and under the control of the switch valve the stored air is fed to the turbine 26.

The turbine 26 converts air energy of the introduced air into kinetic energy, thereby driving the generator 27 to generate electrical power.

The generator 27 is used for charging the battery 22 during power generation.

Specifically, the generator is a direct current generator or an alternating current generator.

In implementation of the novel electric vehicle provided by one embodiment of the present invention, the following beneficial effects can be achieved.

By providing an air compressor, an air storage tank, a turbine and a generator, air energy can be utilized to generate power in parallel with power supplied by the battery. Thus, the continuous mileage of the electric vehicle is increased without causing environmental pollution. Meanwhile, due to the introduction of power generated by air energy, the battery is not a signal power supply and does not need to be continuously discharged for long periods. As a result, the battery can have an effect of shallow charge/discharge, and so the service life of the battery can be prolonged.

Figure 3:
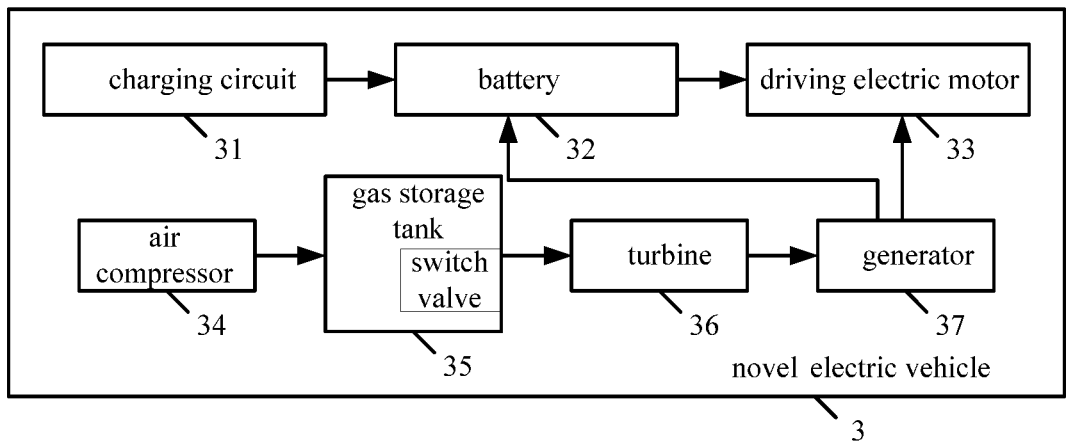
FIG. 3 is a structure diagram for a third embodiment of a novel electric vehicle provided the present invention.

Refer to FIG. 3, it is a structure diagram for a third embodiment of a novel electric vehicle provided by the present invention. As shown in FIG. 3, the novel electric vehicle 3 comprises a charging circuit 31, a battery 32 and a driving electric motor 33 connected together. In addition, the novel electric vehicle 3 further comprises: an air compressor 34, a gas storage tank 35, a turbine 36 and a generator 37 connected together. The generator 37 is connected to the battery 32 and the driving electric motor 33.

When the charging circuit 31 is connected to an external electrical power, the battery 32 is charged and supplies power to the driving electric motor 33.

When connected to an external electrical power, the air compressor 34 may start up, and air is compressed and stored in the air storage tank 35.

Specifically, the air compressor 34 is a direct current air compressor or an alternating current air compressor.

The air storage tank 35 is provided with a corresponding switch valve, and under the control of the switch valve the stored air is fed to the turbine 36.

The turbine 36 converts air energy of the introduced air into kinetic energy, thereby driving the generator 37 to generate electrical power.

The generator 37 is used for supplying power to the driving electric motor 33 and meanwhile charging the battery 32 during power generation.

Specifically, the generator is a direct current generator or an alternating current generator.

In implementation of the novel electric vehicle provided by one embodiment of the present invention, the following beneficial effects can be achieved.

By providing an air compressor, an air storage tank, a turbine and a generator, air energy can be utilized to generate power in parallel with power supplied by the battery. Thus, the continuous mileage of the electric vehicle is increased without causing environmental pollution. Meanwhile, due to the introduction of power generated by air energy, the battery is not a signal power supply and does not need to be continuously discharged for long periods. As a result, the battery can have an effect of shallow charge/discharge, and so the service life of the battery can be prolonged.

Figure 4:
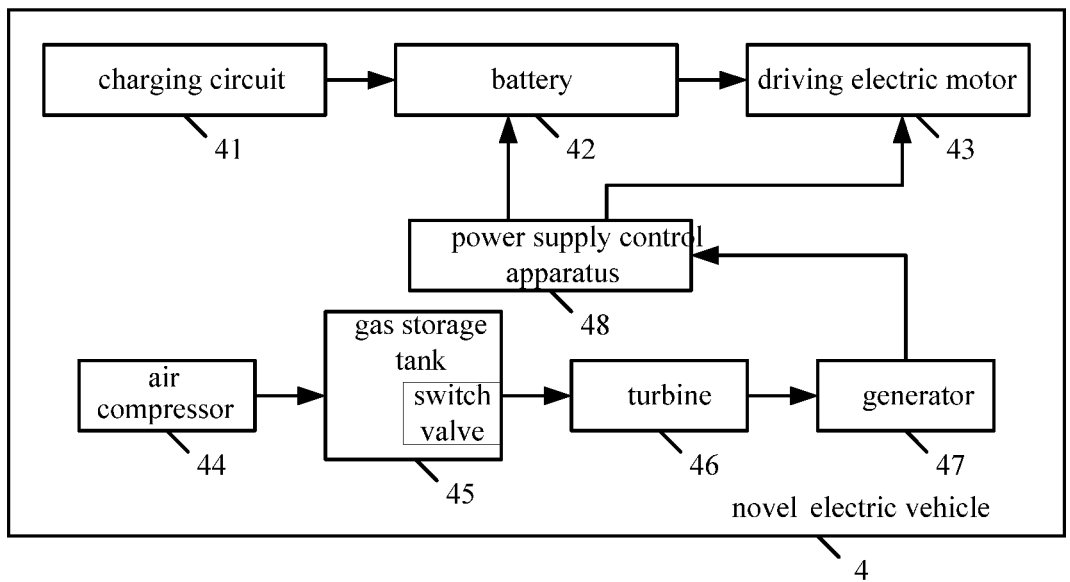
FIG. 4 is a structure diagram for a fourth embodiment of a novel electric vehicle provided the present invention.

Refer to FIG. 4, it is a structure diagram for a fourth embodiment of a novel electric vehicle provided by the present invention. As shown in FIG. 4, the novel electric vehicle 4 comprises a charging circuit 41, a battery 42 and a driving electric motor 43 connected together, and an air compressor 44, an air storage tank 45, a turbine 46, a generator 47 and a power supply control apparatus 48 connected together. The generator 47 is connected to the battery 42 and the driving electric motor 43 by the power supply control apparatus 48.

When the charging circuit 41 is connected to an external electrical power, the battery 42 is charged and supplies power to the driving electric motor 43.

When connected to an external electrical power, the air compressor 44 may start up, and air is compressed and stored in the air storage tank 45.

Specifically, the air compressor 44 is a direct current air compressor or an alternating current air compressor.

The air storage tank 45 is provided with a corresponding switch valve, and under the control of the switch valve the stored air is fed to the turbine 46.

The turbine 46 converts air energy of the introduced air into kinetic energy, thereby driving the generator 47 to generate electrical power.

The generator 47 is used for supplying power to the driving electric motor 43 and/or charging the battery 42 by the power supply control apparatus 48 during power generation.

Specifically, the generator is a direct current generator or an alternating current generator.

The power supply control apparatus 48 is used for controlling the amount of power generated by the generator 47 to supply power to the driving electric motor 43 and/or charge the battery 42.

Figure 5:
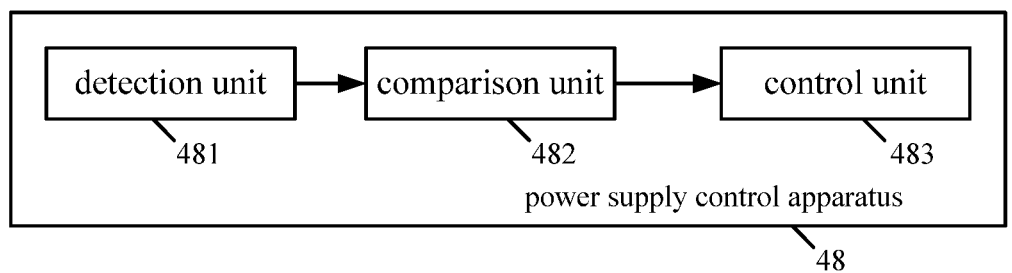
FIG. 5 is a structure diagram for the power supply control apparatus of a novel electric vehicle provided the present invention.

Specifically, the power supply control apparatus 48 comprises a detection unit 481, a comparison unit 482 and a control unit 483, for which one may refer to FIG. 5.

The detection unit 481 for detecting the amount of power generated by the generator 47 and the amount of power required by the driving electric motor 43 during running of the novel electric vehicle.

The comparison unit 482 for comparing the detected amount of generated power with the detected amount of required power, wherein, when the amount of generated power is greater than the amount of required power, the comparison unit sends out a first control signal, and otherwise, the comparison unit sends out a second control signal.

The control unit 483 for, when receiving the first control signal, controlling the generator 47 to provide an amount of the generated power equal to the amount of required power to the driving electric motor 43 and to input a portion of the amount of generated power exceeding the amount of required power to the battery 42 to charge the battery; and when receiving the second control signal, controlling the generator 47 to provide all of the amount of generated power to the driving electric motor 43.

In implementation of the novel electric vehicle provided by one embodiment of the present invention, the following beneficial effects can be achieved.

By providing an air compressor, an air storage tank, a turbine and a generator, air energy can be utilized to generate power in parallel with power supplied by the battery. Thus, the continuous mileage of the electric vehicle is increased without causing environmental pollution. Meanwhile, due to the introduction of power generated by air energy, the battery is not a signal power supply and does not need to be continuously discharged for long periods. As a result, the battery can have an effect of shallow charge/discharge, and so the service life of the battery can be prolonged. In addition, by providing a power supply control apparatus, the amount of power generated by the generator is reasonably distributed, which is beneficial to protection of the battery.

Figure 6:
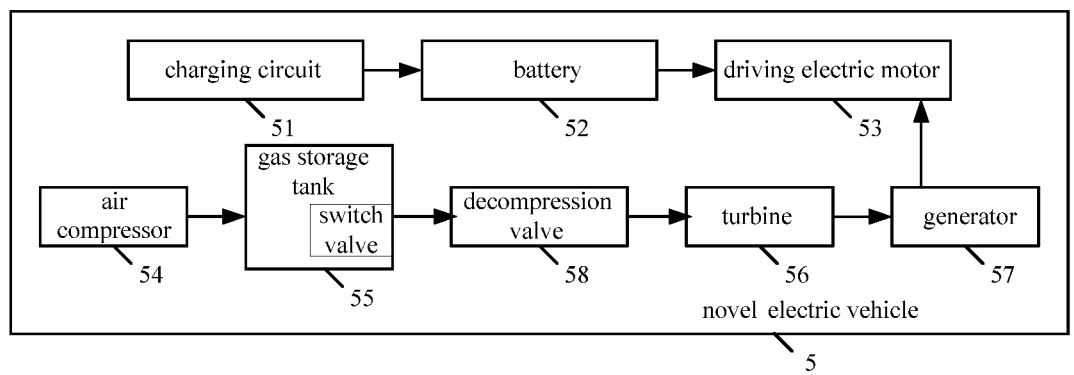
FIG. 6 is a structure diagram for a fifth embodiment of a novel electric vehicle provided the present invention.

Refer to FIG. 6, it is a structure diagram for a fifth embodiment of a novel electric vehicle provided by the present invention. As shown in FIG. 5, the novel electric vehicle 5 comprises a charging circuit 51, a battery 52 and a driving electric motor 53 connected together, and an air compressor 54, an air storage tank 55, a decompression valve 58, a turbine 56 and a generator 57 connected together. The generator 57 is connected to the driving electric motor 53.

When the charging circuit 51 is connected to an external electrical power, the battery 52 is charged and supplies power to the driving electric motor 53.

When connected to an external electrical power, the air compressor 54 may start up, and air is compressed and stored in the air storage tank 55.

Specifically, the air compressor 54 is a direct current air compressor or an alternating current air compressor.

The air storage tank 55 is provided with a corresponding switch valve, and under the control of the switch valve the stored air is fed to the turbine 56 by the decompression valve 58.

The decompression valve 58 is used for decompressing the air outputted by the air storage tank 55.

The turbine 56 converts air energy of the introduced air into kinetic energy, thereby driving the generator 57 to generate electrical power.

Specifically, a vent of the turbine 56 is provided with an airway. The gas discharged by the vent is guided by the airway to the battery to exhaust, which avoids that the battery 52 works in a high temperature environment and helps to prolong the service life of the battery.

Preferably, the vent of the turbine 56 is provided with a gas storage apparatus. The gas storage apparatus is provided with an opening facing to a passenger space in the novel electric vehicle, the opening is provided with a switch valve, the gas in the gas storage apparatus is exhausted from the opening to the passenger space of the novel electric vehicle when the switch valve is opened. Thereby, the passenger can enjoy the same cooling effect as that of an air conditioner without using any air conditioners, and therefore, energy can be saved.

The generator 57 is used for supplying power to the driving electric motor 53 during power generation.

Specifically, the generator is a direct current generator or an alternating current generator.

In implementation of the novel electric vehicle provided by one embodiment of the present invention, the following beneficial effects can be achieved:

Firstly, by providing an air compressor, an air storage tank, a turbine and a generator, air energy can be utilized to generate power in parallel with power supplied by the battery. Thus, the continuous mileage of the electric vehicle is increased without causing environmental pollution. Meanwhile, due to the introduction of power generated by air energy, the battery is not a signal power supply and does not need to be continuously discharged for long periods. As a result, the battery can have an effect of shallow charge/discharge, and so the service life of the battery can be prolonged.

Secondly, by providing an airway, cold air exhausted by the above turbine is guided to the battery to exhaust, which avoids that the battery works in a high temperature environment and helps to prolong the service life of the battery.

Thirdly, by providing a gas storage apparatus and an opening facing to the passenger space in the novel electric vehicle, the cold air exhausted by the turbine is discharged to the passenger space. Thereby, the passenger can enjoy the same cooling effect as that of an air conditioner without using any air conditioners, and therefore, energy can be saved.

The above disclosure provides merely preferred embodiments of the present invention and certainly cannot be used to limit the scope of claims of the present invention. Therefore, any equivalent modification according to the present invention still falls in the protection scope of the present invention.

What is claimed is:

1. An electric vehicle, comprising: a charging circuit, a battery and a driving electric motor, wherein:
   the charging circuit, the battery and the driving electric motor are connected together in sequence;
   the electric vehicle further comprises: an air compressor, an air storage tank, a turbine and a generator, wherein the air compressor, the air storage tank, the turbine and the generator are connected together in sequence, and gas discharged from the turbine is guided to the battery to exhaust;
   air is compressed and stored in the air storage tank when the air compressor starts up;
   the air storage tank is provided with a switch valve, and the air stored in the air storage tank is fed to the turbine under the control of the switch valve;
   the turbine converts air energy of introduced air into kinetic energy to drive the generator to generate electrical power; and
   the generator is connected with the driving electric motor or the battery, for supplying power to the driving electric motor or for charging the battery during power generation.

2. The electric vehicle according to claim 1, wherein, the generator is connected respectively with the driving electric motor and the battery to supply power to the driving electric motor and to charge the battery during power generation.

3. The electric vehicle according to claim 2, further comprising: a power supply control apparatus, wherein, the power supply control apparatus comprises:
   a detection unit for detecting an amount of power generated by the generator and an amount of power required by the driving electric motor during running of the electric vehicle;
   a comparison unit for comparing an amount of generated power with an amount of required power, wherein, when the amount of generated power is greater than the amount of required power, the comparison unit sends out a first control signal, and otherwise, the comparison unit sends out a second control signal; and
   a control unit for, when receiving the first control signal, controlling the generator to provide an amount of the generated power equal to the amount of required power to the driving electric motor and to input a portion of the amount of generated power exceeding the amount of required power to the battery to charge the battery, and when receiving the second control signal, controlling the generator to provide all of the amount of generated power to the driving electric motor.

4. The electric vehicle according to claim 2, further comprising: a decompression valve, wherein:
   the decompression valve is connected between the air storage tank and the turbine, the decompression valve is used for decompressing air outputted by the air storage tank.

5. The electric vehicle of claim 2, wherein:
   gas from the turbine is exhausted to a passenger space of the electric vehicle under the control of the switch valve.

6. The electric vehicle according to claim 2, wherein, the air compressor is a direct current air compressor or an alternating current air compressor.

7. The electric vehicle according to claim 2, wherein, the generator is a direct current generator or an alternating current generator.

8. The electric vehicle according to claim 1, further comprising: a decompression valve, wherein:
   the decompression valve is connected between the air storage tank and the turbine, the decompression valve is used for decompressing air outputted by the air storage tank.

9. The electric vehicle according to claim 1, wherein:
   gas from the turbine is exhausted to a passenger space of the electric vehicle under the control of the switch valve.

10. The electric vehicle according to claim 1, wherein, the air compressor is a direct current air compressor or an alternating current air compressor.

11. The electric vehicle according to claim 1, wherein, the generator is a direct current generator or an alternating current generator.

\* \* \* \* \*